(12) United States Patent  
Sato

(10) Patent No.: US 6,459,328 B1
(45) Date of Patent: Oct. 1, 2002

(54) HIGH SPEED VOLTAGE BOOSTING CIRCUIT

(75) Inventor: Toshiya Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/709,367

(22) Filed: Nov. 13, 2000

(30) Foreign Application Priority Data

Nov. 11, 1999 (JP) .......................................... 11/321823

(51) Int. Cl.$^7$ ................................................. G05F 1/10
(52) U.S. Cl. ..................................................... 327/536
(58) Field of Search ...................... 326/88, 92; 327/390, 327/534, 535, 536, 537

(56) References Cited

U.S. PATENT DOCUMENTS

| | | | | |
|---|---|---|---|---|
| 5,140,182 A | * | 8/1992 | Ichimura | 307/296.1 |
| 5,602,794 A | * | 2/1997 | Javanifard et al. | 365/226 |
| 5,767,735 A | * | 6/1998 | Javanifard et al. | 327/536 |
| 5,821,805 A | * | 10/1998 | Jinbo | 327/537 |
| 5,909,141 A | * | 6/1999 | Tomishima | 327/536 |
| 5,969,988 A | | 10/1999 | Tanzawa et al. | 365/185.23 |
| 6,075,402 A | * | 6/2000 | Ghilardelli et al. | 327/536 |
| 6,208,198 B1 | * | 3/2001 | Lee | 327/536 |

FOREIGN PATENT DOCUMENTS

| | | |
|---|---|---|
| JP | 2-179264 | 7/1990 |
| JP | 6-223588 | 8/1994 |
| JP | 7-111095 | 4/1995 |
| JP | 11-110989 | 4/1999 |

* cited by examiner

*Primary Examiner*—Jeffrey Zweizig
(74) *Attorney, Agent, or Firm*—Sughrue Mion, PLLC

(57) ABSTRACT

A voltage boosting circuit includes a plurality of unit circuits provided in parallel, and a control unit. Each of the plurality of unit circuits includes a charge capacitor connected to an anode of a rectifying element at one end and to a discharge control signal at the other end, and a charge transfer section transferring a charge from the charge capacitor to the charge capacitor of a next one of the plurality of unit circuits in response to a transfer control signal. The last one of the plurality of unit circuits further includes a last rectifying element, and a last capacitor connected to an anode of the last rectifying element at one end and to a discharge control signal at the other end. The charge transfer section in the last unit circuit transfers a charge from the charge capacitor to the last charge capacitor in response to the transfer control signal. Cathodes of a plurality of the rectifying elements and a cathode of the last rectifying element are connected together with each other. The control unit supplies a plurality of the discharge control signal and a plurality of the transfer control signals to the plurality of unit circuits.

22 Claims, 6 Drawing Sheets

HIGH SPEED VOLTAGE BOOSTING CIRCUIT

BACKGROUND OF THE INVENTION

1. Field of the Invention

The present invention relates to a highly efficient voltage boosting circuit.

2. Description of the Related Art

A voltage boosting circuit is a circuit frequently used for generating another voltage from a power supply voltage, and more specifically the higher voltage than the power supply voltage. Generally, in the voltage boosting circuit, a capacitance element is charged from the power supply so that the output voltage is increased. Accordingly, the voltage boosting circuit can generate a boosted voltage having an absolute value greater than a power supply voltage Vcc.

A conventional example of the voltage boosting circuit will be described in more detail with reference to FIG. 1 and FIGS. 2A to E.

The conventional voltage boosting circuit is composed of N-channel transistors N5-1 to N5-8 and capacitors CP5-1 to CP5-8. Clock signals CK5-1 to CK5-4 are supplied to the voltage boosting circuit. A terminal OUT-5-1 is an output terminal for outputting the boosted voltage.

The operation of the voltage boosting circuit shown in FIG. 1 will be described with reference to FIGS. 2A to E. Referring to FIGS. 2A to E, when the clock signal CK5-2 goes to a high level in the state in which the clock signal CK5-3 is at a low level as shown in FIG. 2C, the voltage at the gate of the transistor N5-5 is boosted to a level sufficiently higher than the power supply voltage Vcc through the operation of the coupling capacitor CP5-1. This allows the capacitor CP5-5 to be charged to the power supply voltage Vcc. At this time, the clock signal CK5-4 is at low level so that the transistor N5-6 remains turned off. Therefore, no change is transferred through the transistor N5-6.

Then, the clock signal CK5-2 goes to the low level to turn off the transistor N5-5. As the clock signal CK5-3 goes to the high level, the potential of the capacitor CP5-5 is increased to the potential equal to twice of the power supply voltage Vcc when a loss caused by parasitic capacitance is negligible.

While the boosted level is maintained, the clock signal CK5-4 goes to the high level so that the transistor N5-6 is turned on. At this time, the clock signal CK5-1 held at the low level. Thus, the voltage at the gate of the transistor N5-6 is increased to a level higher than the power supply voltage. As a result, the charge stored in the capacitor CP5-5 is transferred to the capacitor CP5-6. The voltages of the capacitors CP5-7 and CP5-8 are boosted in the same manner as described above, and the boosted voltage is finally outputted from the terminal OUT5-1.

As described above, if any loss caused by parasitic capacitance is negligible, the voltage boosting circuit can boost the input voltage to (the number of capacitance elements plus one) multiplied by the power supply voltage Vcc. Similar to the boosting operation of a positive voltage, the input voltage can be boosted in a negative direction.

However, in the above conventional voltage boosting circuit there are some problems in that current consumption is much and the boosting operation is slow. Particularly, the problems are severe when the output terminal is linked to a load capacitor. Such a case will be described below referring to FIG. 1.

As the output terminal is linked to a large load capacitor, the voltage at the output terminal OUT5-1 cannot be rapidly increased to a desired voltage even if the boosting operation is repeated. In this case, the voltage between the source and the drain in each of the switching elements (the transistors N5-5 to N5-8) is hardly increased. Accordingly, the voltage at the output terminal continues to be lower than the boosted voltage by the capacitance elements (the capacitor CP5-5 to CP5-8) of the four stages. In this state, therefore, driver elements for driving the clock signals CK5-3 to CK5-1 ill consume the current in vain. More specifically, while the voltage at the output terminal OUT5-1 is as low as the power supply voltage Vcc, three of the boosting capacitance elements (the capacitor CP5-5 to CP5-8) are unnecessary and will only increase the current consumption.

For the purpose to overcome the above problems, a voltage boosting circuit is disclosed in Japanese Laid Open Patent Application (JP-A-Heisei 7-111095). In this reference, the efficiency of power usage is improved when the output voltage is low, so that the time of the boosting operation is shortened. The voltage boosting circuit is composed of booster cells and a switching circuit for switching the connection of the booster cells. The switching circuit is arranged between the booster cells. The booster cells are grouped into groups. The switching circuit connects the groups to the output terminal in parallel. In each group, one or more booster cells are connected in series. The number of booster cell groups, and the number of booster cells in the group are variable.

However, in the voltage boosting circuit disclosed in the above reference, the booster cells and the switching circuit are separately provided. Accordingly, the current consumption is still abundant.

In conjunction with the above description, a voltage boosting circuit is disclosed in Japanese Laid Open Patent Application (JP-A-Heisei 2-179264). In this reference, the voltage boosting circuit is composed of a plurality of boosting blocks, switches, a voltage determining section and a circuit selecting section. Each of the plurality of boosting blocks is composed of a plurality of diodes connected in series between a power supply voltage input terminal and a boosting voltage output terminal or a circuit equivalent to the plurality of diodes, and a capacitor connected to a node between every two of the plurality of diodes. A desired boosted voltage is produced through a forward direction charge transfer operation by the diodes and the capacitors. The switches are provided between the power supply voltage input terminal and the boosting blocks, respectively. The voltage determining section determines an input voltage level at the power supply voltage input terminal. The circuit selecting section controls the switches based on the determining result of the voltage determining section to select ones of the boosting blocks.

Also, a non-volatile semiconductor memory is disclosed in Japanese Laid Open Patent Application (JP-A-Heisei 6-223588). In this reference, a plurality of basic circuit 20 for carrying out a voltage boosting operation is grouped into a plurality of groups. Clock signals φ1 and φ2 are supplied to each basic circuits 20 of a part of the groups from the start of the voltage boosting operation. The clock signals φ1 and φ2 are supplied to each basic circuit 20 of another part of the groups after a predetermined time passes since from the start of the voltage boosting operation. The above clock signals φ1 and φ2 are supplied to each basic circuit 20 of the remaining groups after a further predetermined time passes. Thus, in the non-volatile semiconductor memory which has a voltage boosting circuit, the increase of the chip area is suppressed the to the minimum. Also, the decrease of the boosted voltage can be prevented.

Also, a voltage boosting circuit is disclosed in Japanese Laid Open Patent Application (JP-A-Heisei 11-110989). In this reference, the voltage boosting circuit has 4-phase clock signal. A drive clock signal is supplied to the gate of a boosting transistor the transistor N1 provided between the gate Q1 and the drain P1 in a charge transfer transistor M1. The drive clock has the same timing as that at a node P2 which is located at a predetermined number of stages from a node P1 in a P2 direction. For example, when the gate of the transistor the transistor N1 is connected with a node P4, the charge transfer efficiency by the transistor the transistor N1 can be improved.

SUMMARY OF THE INVENTION

Therefore, an object of the present invention is to provide a voltage boosting circuit of low power consumption.

Another object of the present invention is to provide a voltage boosting circuit which can provided a boosted voltage quickly.

In order to achieve an aspect of the present invention, a voltage boosting circuit includes a plurality of unit circuits provided in parallel, and a control unit. Each of the plurality of unit circuits includes a charge capacitor connected to an anode of a rectifying element or a diode at one end and to a discharge control signal at the other end, and a charge transfer section transferring a charge from the charge capacitor to the charge capacitor of a next one of the plurality of unit circuits in response to a transfer control signal. The last one of the plurality of unit circuits further includes a last rectifying element, and a last capacitor connected to an anode of the last rectifying element at one end and to a discharge control signal at the other end. The charge transfer section in the last unit circuit transfers a charge from the charge capacitor to the last charge capacitor in response to the transfer control signal. Cathodes of a plurality of the rectifying elements and a cathode of the last rectifying element are connected together with each other. The control unit supplies a plurality of the discharge control signal and a plurality of the transfer control signals to the plurality of unit circuits.

Here, the charge capacitors and the last charge capacitor are charged from a power supply. In this case, the one end of each of the charge capacitors and the last charge capacitor is connected to the power supply via at least a rectifying element. Also, each of the plurality of unit circuits further includes a charging section charging the charge capacitor in response to a charge control signal. The control unit further supplies a plurality of the charge control signals to the plurality of unit circuits. In this case, the charging section includes a coupling capacitor connected to the charge control signal at one end, and a transistor which has a gate connected to the other end of the coupling capacitor, a drain connected to the power supply, and a source connected to the one end of the charge capacitor. In this case, the charging section further includes a holding transistor having a gate connected to the one end of the charge capacitor, a drain connected to the power supply, and a source connected to the gate of the transistor.

Also, the charge transfer section may include a coupling capacitor connected to the transfer control signal at one end, and a transistor having a gate connected to the other end of the coupling capacitor, a drain connected to the charge capacitor, and a source connected to the one end of the charge capacitor in a next one of the plurality of charge capacitor. The charging section further includes a holding transistor having a gate connected to the source of the transistor, a drain connected to the one end of the charge capacitor, and a source connected to the gate of the transistor. Also, the charge transfer section may further includes a preset transistor charging the gate of the transistor in response to a preset signal, the preset transistor having a gate connected to the preset signal, a drain connected to the power supply and a source connected to the gate of the transistor.

In another aspect of the present invention, a voltage boosting method is attained by storing charges in charge capacitors; by sequentially transferring the charges to a last one of charge capacitors to boost a voltage of the last charge capacitor; and by subsequently charging the output capacitor component with the charge stored in the last charge capacitor.

Here, the voltage boosting method may further include initially charging an output capacitor component with the charges stored in the charge capacitors.

Also, the initially charging may be attained by supplying a bias voltage to the charge capacitors.

Also, the sequentially transferring may be attained by intermediately charging the output capacitor component with the charge stored in each of the charge capacitors while sequentially transferring the charges to the last charge capacitor.

Also, the sequentially transferring may be attained by supplying a bias voltage to a current one of the charge capacitor; and by removing the bias voltage from a next one of the charge capacitors.

Also, the subsequently charging may be attained by supplying a bias voltage to the last charge capacitor.

Also, the voltage boosting method may further include: charging the output capacitor component using a power supply voltage previous to the initial charging.

DESCRIPTION OF THE PREFERRED EMBODIMENTS

Hereinafter, a voltage boosting circuit of the present invention will be described below in detail with reference to the attached drawings.

Figure 1:
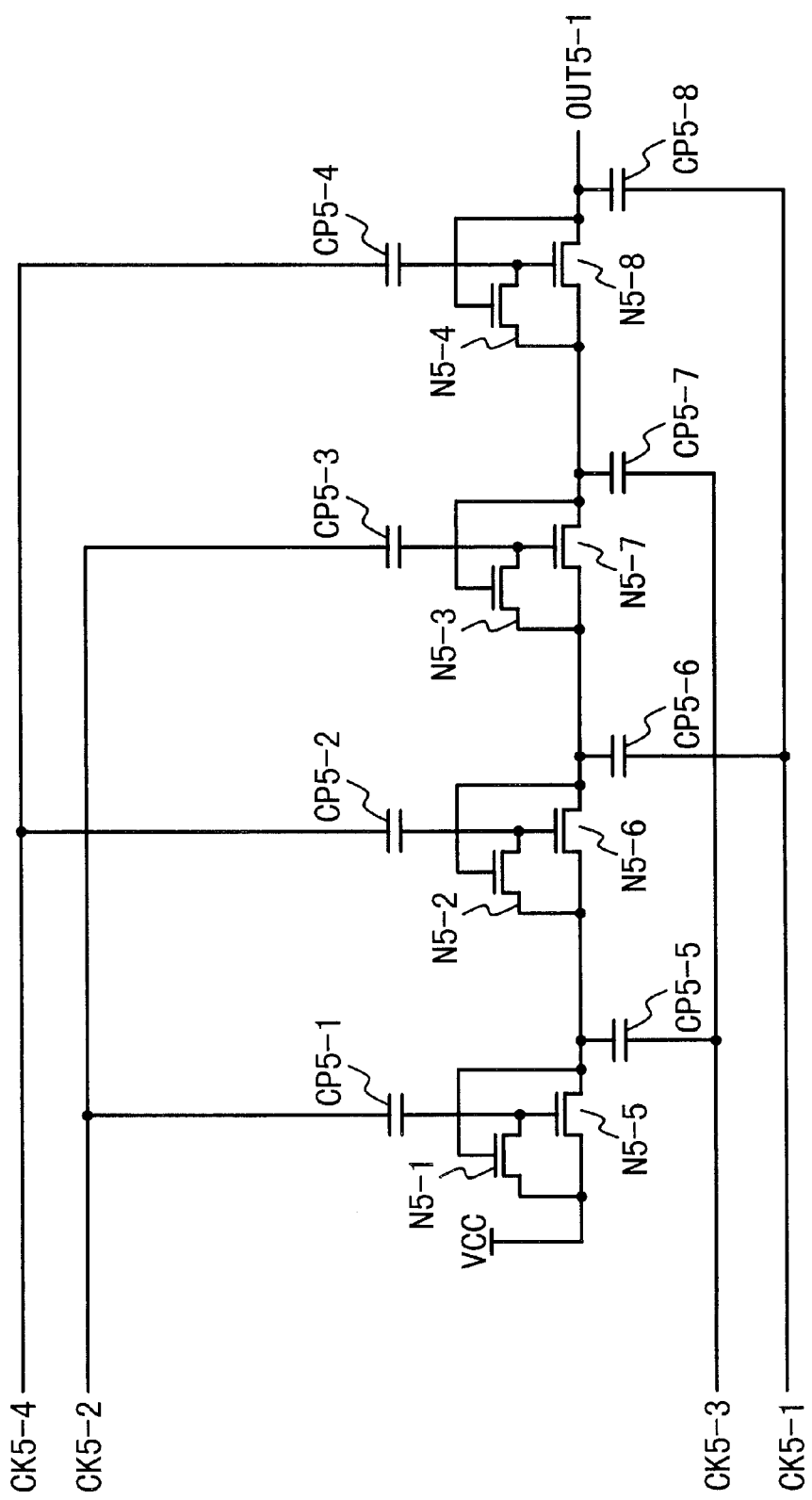
FIG. 1 is a circuit diagram showing the structure of a conventional voltage boosting circuit.
Figure 2:
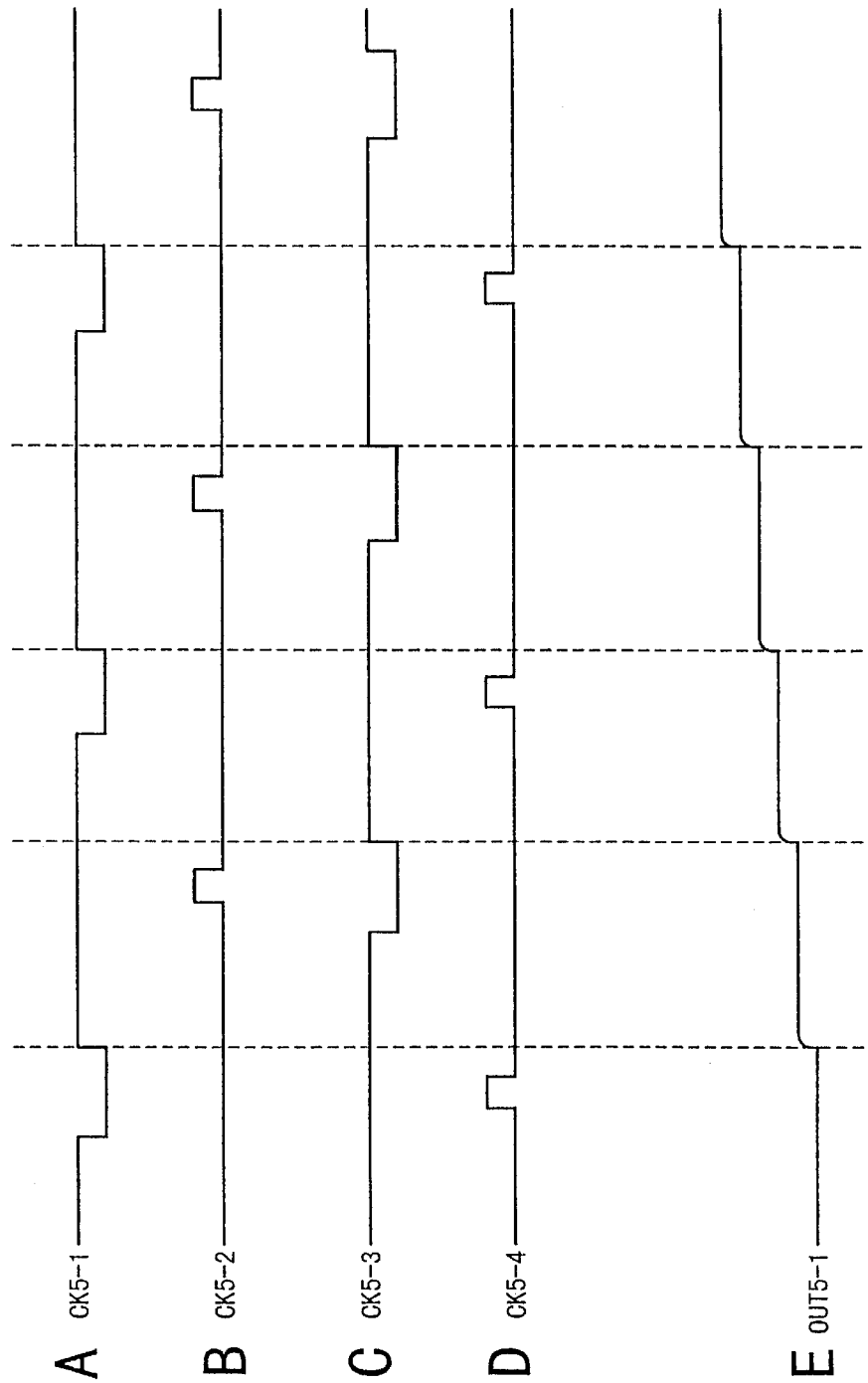
FIGS. 2A to E shows a timing chart for the description of an operation of the conventional voltage boosting circuit.
Figure 3:
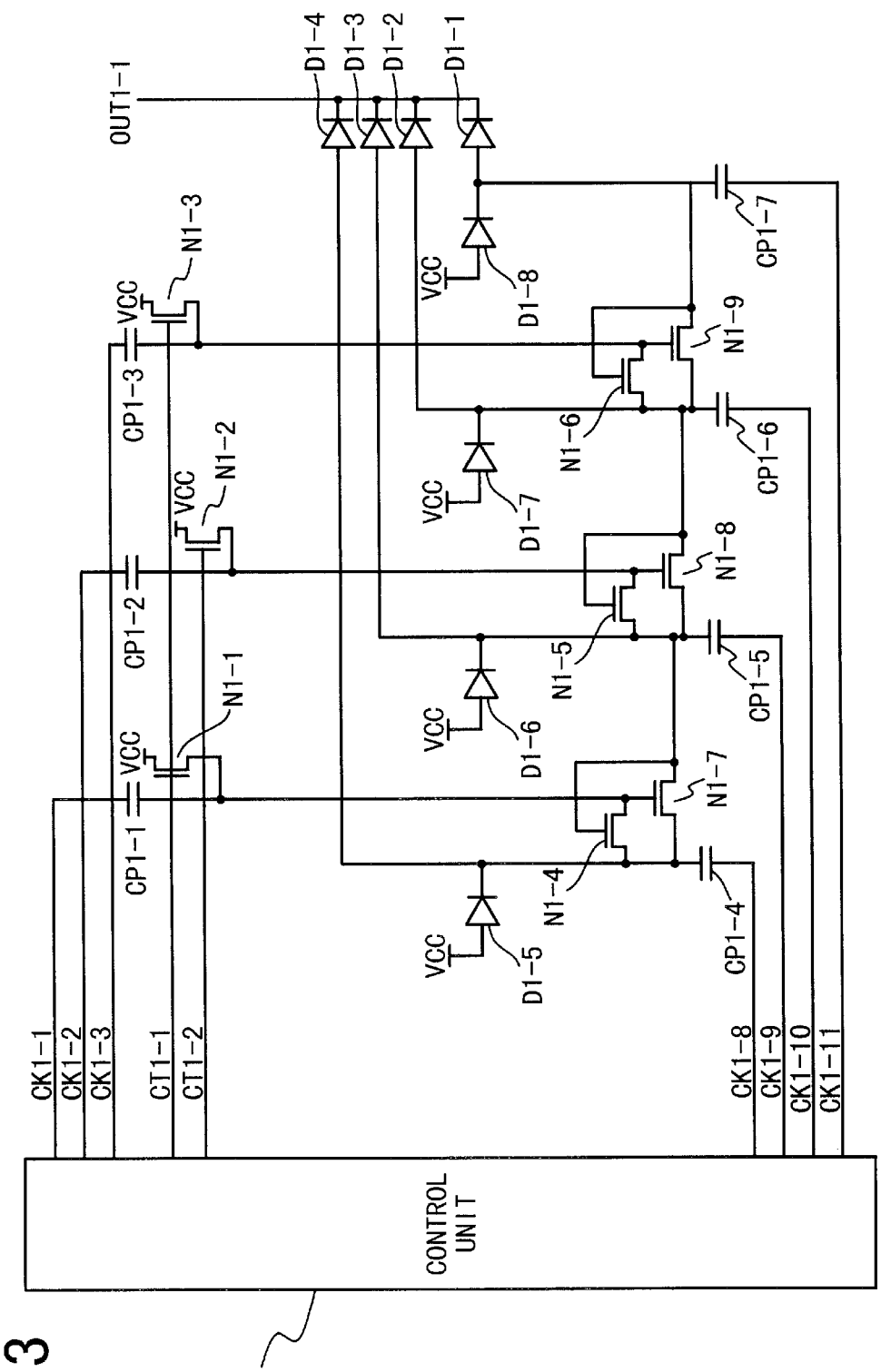
FIG. 3 is a ciruit diagram showing the structure of a voltage boosting circuit according to a first embodiment of the present invention.

FIG. 3 is a circuit diagram showing the structure of a voltage boosting circuit according to the first embodiment of the present invention. Referring to FIG. 3, the voltage boosting circuit of this embodiment is composed of a control unit 10, nine N-channel MOS transistors N1-1 to N1-9, seven capacitors CP1-1 to CP1-7, and eight diodes D1-1 to D1-8 as rectifying elemtns. The control unit 10 supplies seven clock signals CK1-1 to CK1-3 and CK1-8 to CK1-11 and two control signals CT1-1 and CT1-2. In this embodiment, the eight diode elements are used. However, any other elements can be used for transferring charge in one direction.

The diode elements D1-1 to D1-4 are connected in parallel to output a boosted voltage. The diode elements D1-5 to D1-8 are provided for receiving charge for a boosting operation from a power supply Vcc.

The capacitance elements CP1-1 to CP1-3 are provided as coupling capacitors to control an operation of the N-channel transistors N1-7 to N1-9. The capacitors CP1-4 to CP1-7 are provided for the boosting operation.

The N-channel transistors N1-4 to N1-9 are provided as charge transfer transistors the charge transfer in the boosting operation. The N-channel transistors N1-1 to N1-3 are provided to supply voltages to the charge transfer transistors.

The clock signals CK1-1 to CK1-3 are used to control the charge transferring operation of the charge transfer transistors via the capacitor CP1-1 to CP1-3. The clock signals CK1-8 to the clock signal CK1-11 are used to supply bias voltages to the capacitors CP1-4 to CP1-7 in the boosting operation. The control signals CT1-1 and CT1-2 are provided to control the voltage supply to the charge transfer transistors N1-7 to N1-9.

The capacitor CP1-1 is connected at one end to the clock signal CK1-1. The N-channel transistor N1-1 is connected at its source to the other end of the capacitor CP1-1 and at its gate to the control signal CT1-1. The capacitor CP1-4 is connected at one end to the clock signal CK1-8. The N-channel transistor N1-7 is connected at its gate to the source of the N-channel transistor N1-1 and at its drain to one end of the capacitor CP1-4. The N-channel transistor N1-4 is connected at its gate to the source of the N-channel transistor N1-7, at its source to the end of the capacitor CP1-4, and at its drain to the gate of the N-channel transistor N1-7. The diode D1-5 is connected at its cathode to the source of the N-channel transistor N1-4 and at its anode to the power supply voltage Vcc as a constant voltage source. The diode D1-1 is connected at its anode to the cathode of the diode element D1-8 and at its cathode to the output terminal OUT1-1. Those components constitute a single unit voltage boosting circuit. The unit voltage boosting circuit is a circuit composed of the least number of relevant components for boosting the voltage. The components in the unit voltage boosting circuit of this embodiment are the two clock signals CK1-1 and CK1-8, the two capacitors CP1-1 and CP1-4, the three N-channel transistors N1-1, N1-4, and N1-7, and the diodes D1-5 and D1-4.

The source of the N-channel transistor N1-7 in this unit voltage boosting circuit is connected to the source of the N-channel transistor N1-5 in a next-stage unit voltage boosting circuit.

FIGS. 4A to J shows a timing chart of the signals CK-1 to CK1-3, CT1-1, CT1-2, CK1-8 to CK1-11, and OUT1-1.

Figure 4:
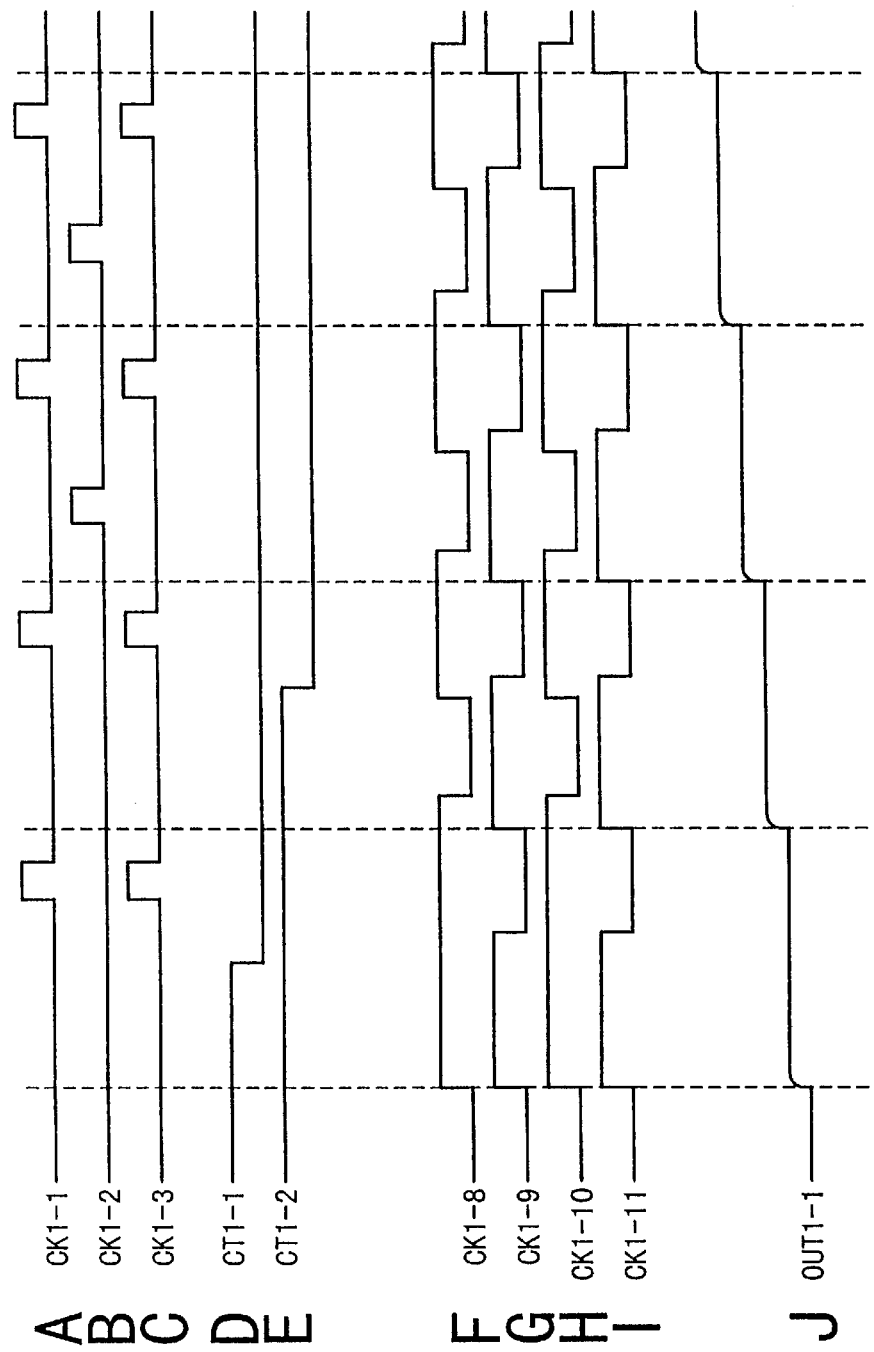
FIGS. 4A to J shows timing charts for the description of an operation of the voltage boosting circuit according to the first embodiment of the present invention.

The boosting operation in this embodiment will be now described. At the beginning of the boosting operation, the capacitors CP1-4 to CP1-7 are charged with the power supply voltage Vcc. Also, the output terminal OUT1-1 is charged with the power supply voltage Vcc. Also, the two control signals CT1-1 and CT1-2 are at the high level as shown in FIGS. 4D and E so that the transistors N1-1 to N1-3 are turned on to supply voltages to the gates of the transistors N1-7 to N1-9. Thus, the transistors N1-7 to N1-9 are set to the state in which the transistors N1-7 to N1-9 are in the off state but can be easily turned on. Also, the clock signals CK1-1 to CK1-3 are at the low level, as shown in FIGS. 4 A to C. Accordingly, the N-channel transistors N1-7 to N1-9 remain turned off. For starting the operation, when the clock signals CK1-8 to CK1-11 are changed from the low level to the high level as shown in FIGS. 4F to I, the potentials at the end of the capacitors CP1-4 to CP1-7 connected to the anodes of the diodes D1-4 to D1-1 are increased to the potential level of 2×Vcc as shown in FIG. 4J, provided that no parasitic capacitance is concerned. Therefore, the charges stored in the respective capacitors CP1-4 to CP1-7 are discharged from the capacitors CP1-4 to CP1-7 to the output terminal OUT1-1 via the diodes D1-1 to D1-4. Thus, the output terminal OUT1-1 is charged to a potential level approximately equal to the potential of 2×Vcc. Upon the voltage at the output terminal OUT1-1 reaching substantially 2×Vcc, the control unit 10 changes the control signal CT1-1 from the high level to the low level as shown in FIG. 4D so that the transistors N1-1 and N1-3 are turned off. Also, the clock signals CK1-9 and CK1-11 are changed from the high level to the low level as shown in FIGS. 4G and I. Thus, the capacitors CP1-5 and CP1-7 are charged with the power supply voltage. While the clock signals CK1-9 and CK1-11 is at the low level, the two clock signals CK1-1 and CK1-3 are changed from the low level to the high level at the same timing, as shown FIGS. 4A and C. Then, the two clock signals CK1-1 and CK1-3 are changed from the high level to the low level at the same timing. The transistors N1-7 and N1-9 are turned on in response to the clock signals CK1-1 and CK1-3, respectively. Therefore, the capacitors CP1-4 and CP1-6 which are supplied with the bias voltages carry out a discharging operation. That is, the charges stored in the capacitors CP1-4 and CP1-6 are transferred to the capacitors CP1-5 and CP1-7 via the charge transfer transistors N1-7 and N1-9. At this time, the transistor N1-4 and N1-6 holds the gate voltages based on the source voltages of the charge transfer transistors N1-7 and N1-9. Thus, the capacitors CP1-5 and CP1-7 are charged to the voltage of 2×Vcc. This is because discharge control signals supplied to the gates of the charge transfer transistors N1-7 and N1-9 via the capacitors CP1-1 and CP1-3 have a very short signal width. The transistor N1-4 and N1-6 holds the gate voltages of the charge transfer transistors N1-7 and N1-9 in an on range.

Subsequently, the clock signals CK1-9 and CK1-11 are changed from the low level to the high level as shown in FIGS. 4G and I so that a part of the charges stored in the capacitors CP1-5 and CP1-7 is transferred to the output terminal OUT1-1 via the diodes D1-3 and D1-4. As a result, the output terminal OUT1-1 is charged to the voltage of 2×Vcc. At that time, the clock signals CK1-8 and CK1-10 are changed from the high level to the low level as shown in FIGS. 4F and H so that the capacitors CP1-4 and CP1-6 are charged with the power supply voltage Vcc. Then, the control signal CT-2 is changed from the high level to the low level to allow the transistor N1-8 to be driven. Subsequently, the clock signals CK1-8 and CK1-10 are changed from the low level to the high level, and the clock signals CK1-9 and CK1-11 are changed from the low level to the high level as shown in FIGS. 4F to I. As a result, the charges stored in the capacitors CP1-4 and CP1-6 are transferred to the capacitors CP1-5 and CP1-7 via the transistors N1-7 and N1-9, because the clock signals CK1-1 and CK1-3 are clocked, as shown in FIGS. 4A and C. Thus, the capacitors CP1-5 and CP1-7 are changed to the voltage of 2×Vcc. In this case, since the output terminal OUT1-1 has been charged to the voltage of 2×Vcc, the capacitors CP1-5 and CP1-7 do not discharge.

This operation is equivalent to the parallel operation of two unit voltage boosting circuits, one having two boosting capacitors CP1-4 and CP1-5 or the other having the capacitors CP1-6 and CP1-7.

Next, the clock signals CK1-8 to CK1-10 are held at the high level for a short time while the two control signals CT1-1 and CT1-2 stay at the low level. Then, the clock signals CK1-8 and CK1-10 are changed from the high level to the low level as shown in FIGS. 4F and H. As a result, the capacitors CP1-4 and CP1-6 are charged with the power supply voltage Vcc. At that time, as shown in FIG. 4B, the clock signal CK1-2 is supplied so that the charge transfer transistor N1-8 is turned on. Thus, the charge stored in the capacitor CP1-5 is transferred to the capacitor CP1-6. Consequently, the capacitor CP1-6 is charged to the voltage of 3×Vcc. Subsequently, the transistor N1-8 is turned off and the clock signal CK1-11 is changed from the high level to the low level. Also, the clock signal CK1-3 is supplied to turn on the transistor N1-9. Accordingly, the charge stored in the capacitor CP1-6 is transferred to the capacitor CP1-7 via the transistor N1-9. As a result, the capacitor CP1-7 is charged to the voltage 4×Vcc. Thus, the output terminal OUT1-1 is charged to the voltage of 4×Vcc. At this time, the capacitor CP1-5 is charged to the voltage of 2×Vcc, since the clock signal CK-1 is at the high level, the clock signal CK1-9 is at the low level and the clock signal CK1-1 is clocked.

By repeating the above operations, the boosted voltage several integer times greater than the power supply voltage Vcc can be outputted to the output terminal OUT1-1.

The charge transferred by the above operation can be always transferred to another unit voltage boosting circuit at the succeeding stage, hence minimizing the current consumption. Also, the parallel operations can be performed, thus speeding up the boosting operation.

Moreover, if a voltage detecting circuit (not shown) is provided to detect the voltage at the output terminal OUT1-1, the control unit 10 may change the timings of the signals CK1-1 to CK1-3, CK1-8 to CK1-11 and CT1-1 an CT1-2 based on the detecting result of the voltage detecting circuit. Thus, the connection state of the unit voltage boosting circuits can be changed. For example, until a desired voltage is obtained at the output terminal OUT1-1, the unit voltage boosting circuit may be added one by one each time the desired voltage is increased by the power supply voltage Vcc. Alternatively, for having a desired voltage at the output terminal OUT1-1, the unit voltage boosting circuits may be joined to one another one plus a rounded-off value of the desired voltage divided by the power supply voltage.

As described above, in the first embodiment of the present invention, the connection of unit voltage boosting circuits, each having a boosting function, can be modified. Accordingly, the unit voltage boosting circuits can be connected to one another in an optimum manner based on the voltage difference between the output terminal and the power supply voltage Vcc. For example, assuming that a voltage boosting circuit is based on four different types of the primary components, two sets of two unit voltage boosting circuits connected in series are connected in parallel with each other, for the output terminal voltage of 2×Vcc. The connection of the unit voltage boosting circuits can be varied based on a resultant boosted voltage at the output terminal to carry out the high-speed boosting operations at minimum of current loss.

Next, the voltage boosting circuit according to the second embodiment of the present invention will now be described referring to FIG. 5 and FIGS. 6A to N.

Figure 5:
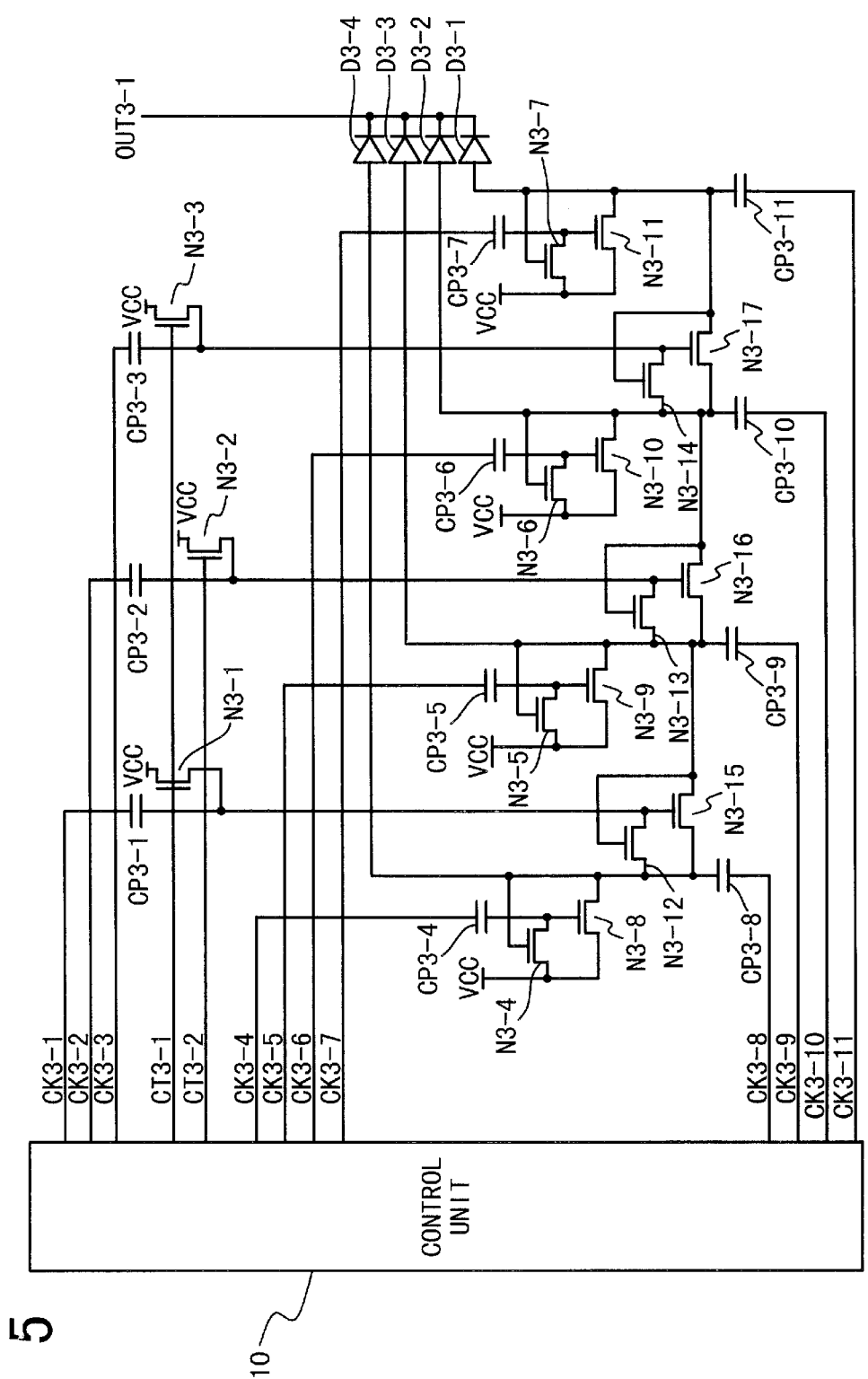
FIG. 5 is a circuit diagram showing the structure of a voltage boosting circuit according to a second embodiment of the present invention.

FIG. 5 is a circuit diagram of the voltage boosting circuit according to the second embodiment of the present invention. Referring to FIG. 5, the voltage boosting circuit in this embodiment is different from that of the first embodiment in that a group of N-channel transistors N3-4 to N3-11, and capacitors CP3-4 to CP3-7 are used in place of the diodes D1-5 to D1-8 for transferring charge from the power supply voltage Vcc. New clock signals CK3-4 to CK3-7 are supplied.

The capacitor CP3-4 is connected at one end to the clock signal CK3-4. The N-channel transistor N3-8 is connected at its gate to the other end of the capacitor CP3-4, its source to one end of the capacitor CP1-4, and at its drain to the power supply voltage Vcc source. The N-channel transistor N3-4 is connected at its gate to the source of the N-channel transistor N3-8, its source to the drain of the N-channel transistor N3-8, and at its drain to the gate of the N-channel transistor N3-8. The capacitors CP3-4 to CP3-7 and the transistors N3-4 to N3-6 have the same functions as the capacitors CP1-1 to CP1-3 and the transistors N1-4 to N1-6 in the first embodiment.

The boosting operation in this embodiment will be now described with reference to FIGS. 6A to N.

At the beginning of the boosting operation, the capacitors CP3-4 to CP3-7 are not charged with the power supply voltage Vcc. The two control signals CT3-1 and CT3-2 are at the high level as shown in FIGS. 6D to E so that the transistors N3-1 to N3-3 are turned on to supply voltages to the gates of the transistors N3-15 to N3-17. Thus, the transistors N3-15 to N3-17 are set to the state in which the transistors N3-15 to N3-17 are in the off state but can be easily turned on. Also, the clock signals CK3-1 to CK3-3 are at the low level, as shown in FIGS. 6A to C. Accordingly, the N-channel transistors N3-15 to N3-17 remain turned off. For starting the boosting operation, the clock signals CK3-4 to CK3-7 are turned on to charge the capacitors CP3-8 to CP3-11 and the output terminal OUT3-1 with the power supply voltage Vcc.

Next, when the clock signals CK3-8 to CK3-11 are changed from the low level to the high level as shown in FIGS. 6J to M, the potentials at the end of the capacitors CP3-8 to CP3-11 connected to the anodes of the diodes D3-4 to D3-1 are increased to the potential level of 2×Vcc, if a parasitic capacitance is negligible. Therefore, the charges stored in the respective capacitors CP3-8 to CP3-11 are discharged from the capacitors CP3-8 to CP3-11 to the output terminal OUT3-1 via the diode D3-1 to D3-4. Thus, the output terminal OUT3-1 is charged to a potential level approximately equal to the potential of 2×Vcc.

Upon the voltage at the output terminal OUT3-1 reaching substantially the 2×Vcc, the control unit 10 changes the control signal CT1-1 from the high level to the low level as shown in FIG. 6D so that the transistors N3-1 and N3-3 are turned off. Also, the clock signals CK3-9 and CK3-11 are changed from the high level to the low level as shown in FIGS. 6K and M. At this time, the clock signals CK3-1 and CK3-3 are clocked, so that the transistors N3-15 and N3-17 are turned on. As a result, the capacitors CP3-9 and CP3-11 are charged to the voltage of 2×Vcc with charge stored in the capacitors CP3-8 and CP3-11.

Next, for a short time, the clock signals CK3-8 to CK3-11 are set to the high level. Then, the clock signals CK3-4 and CK3-10 is set to the low level. Also, the clock signals CK3-4 and CK3-6 are clocked. As a result, the capacitors CP3-8 and CP3-10 are charged to the voltage of Vcc with the power supply voltage. Also, since the two clock signals CK3-9 and CK3-11 are held at the high level, a part of charge stored in the capacitors CP3-9 and CP3-11 is transferred to the output terminal OUT3-1.

Subsequently, the clock signals CK3-8 and CK3-10 are changed from the low level to the high level at the same timing, as shown FIGS. 6J and L. Then, the two clock signals CK3-9 and CK3-11 are changed from the high level to the low level at the same timing. At that time, the two clock signals CK3-1 and CK3-3 are clocked at the same timing, as shown in FIGS. 6,A and C. Accordingly, the transistors N3-15 and N3-17 are turned on in response to the clock signals CK3-1 and CK3-3, respectively. Therefore, the capacitors CP3-8 and CP3-10 which are supplied with the bias voltages carry out a discharging operation. That is, the charges stored in the capacitors CP3-8 and CP3-10 are transferred to the capacitors CP3-9 and CP3-11 via the charge transfer transistors N3-15 and N3-17. Thus, the capacitors CP3-9 and CP3-11 are charged to the voltage of 2×Vcc.

Figure 6:
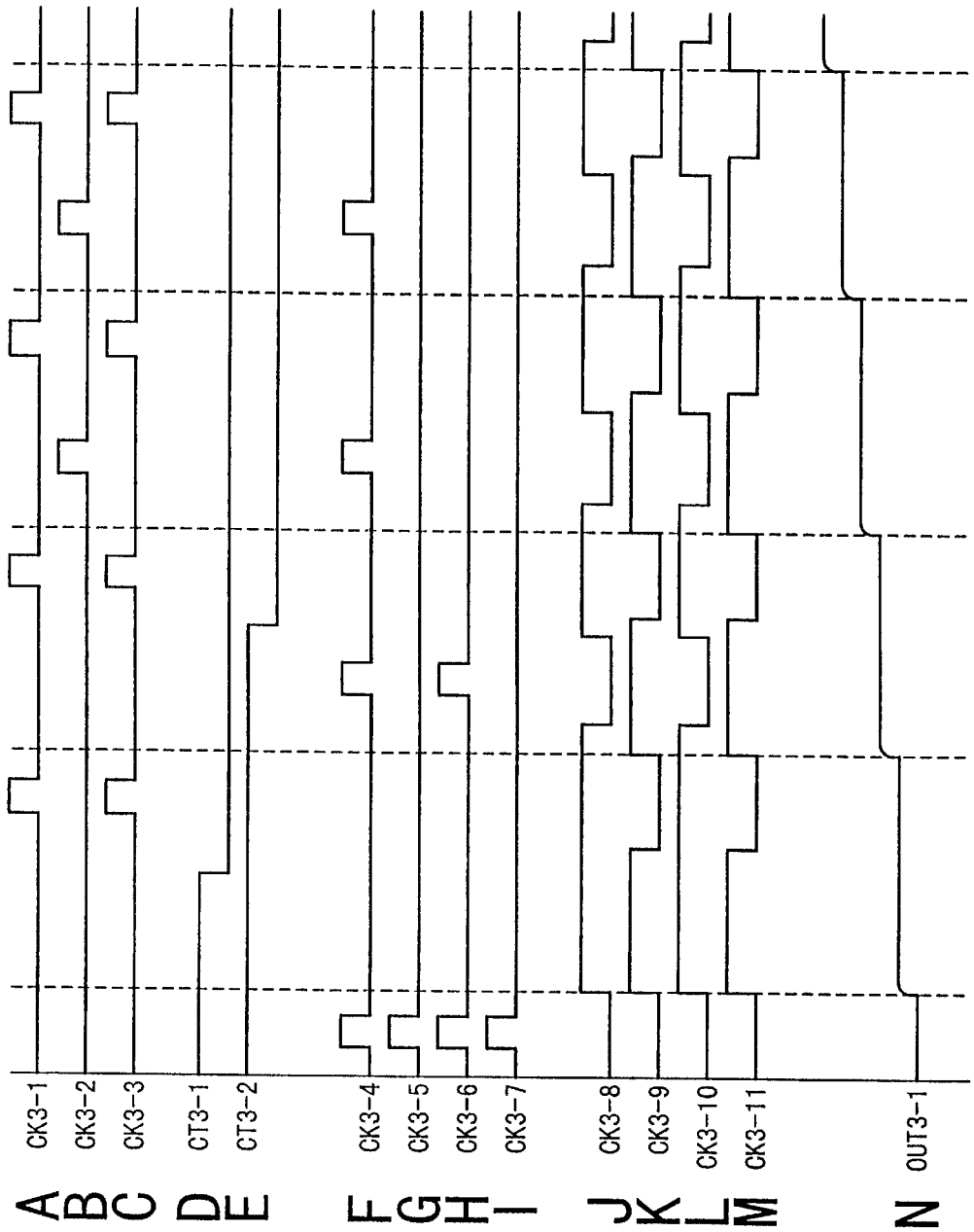
FIGS. 6A to N shows a timing chart for the description of an operation of the voltage boosting circuit according to the second embodiment of the present invention.

Subsequently, after the clock signals CK3-8 to CK3-11 are held at the high level for a short time, the clock signals CK3-8 and CK3-10 are changed from the high level to the low level as shown in FIGS. 6,J and L. At this time, the clock signal CK3-4 is clocked so that the capacitor 3-8 is charged with the power supply voltage Vcc. Also, the clock signal CK3-2 is clocked, so that the transistor N3-16 is turned on. As a result, the charge stored in the capacitor CP3-9 is transferred to the capacitor CP3-10 via the transistor N3-16 so that the capacitor CP3-10 is charged to the voltage of 3×Vcc. At the same time, a part of the charge is discharged to the output terminal OUT3-1 via the diode D3-3. The capacitor CP3-11 is also biased with the clock signal CK3-11 but since the output terminal OUT3-1 is charged to the voltage of 2×Vcc, the capacitor CP3-11 does not discharge.

Subsequently, the clock signals CK3-8 and CK3-10 are changed from the low level to the high level and then the clock signals CK3-9 and CK3-11 are changed from the high level to the low level. Also, the clock signals CK3-1 and CK3-3 are clocked so that the transistors N3-15 and N3-17 are turned on. Thus, the charge stored in the capacitor CP3-10 is transferred to the capacitor CP3-11 via the transistor N3-17 so that the capacitor CP3-11 is charged to the voltage of 4×Vcc. At this time, the charge stored in the capacitor CP3-8 is transferred to the capacitor CP3-9 via the transistor N3-15 so that the capacitor CP3-9 is charged to the voltage of 2×Vcc.

Subsequently, the clock signal CK3-11 is changed from the low level to the high level so that the charge stored in the capacitor CP3-11 is discharged to the output terminal OUT3-1 via the diode D3-1.

As described above, the boosting operation of the voltage boosting circuit of this embodiment is substantially identical to that of the first embodiment. In the second embodiment, the input signals CK3-4 to CK3-7 are added to the voltage boosting circuit of the first embodiment, so that a faster boosting operation than that of the first embodiment is realized in the voltage boosting circuit of this embodiment.

The voltage boosting circuit of this embodiment can increase the charge received from the power supply and used for the boosting operation. In the first embodiment, the charge is stored in the capacitor from the power supply via the diode element D3-5 to D3-8. The voltage is equal to (the power supply voltage Vcc)−(a diode threshold). Therefore, the efficiency of the transfer operation is reduced. In the voltage boosting circuit of the second embodiment, when desired capacitors for the boosting operation should be charged, the ones of the clock signal CK3-4 to CK3-7 corresponding to the desired capacitors are clocked to the high level. Thus, corresponding ones of the N-channel transistors N3-8 to N3-11 can be turned on for charge transfer. Also, the capacitors CP3-8 to CP3-11 can be charged directly with the power supply voltage Vcc, thus speeding up the boosting operation.

While the voltage boosting circuit for boosting the voltage to a positive level is described in this embodiment, it is possible to structure the voltage boosting circuit for outputting a negative voltage.

As set forth above, according to the voltage boosting circuit of the present invention, the unit voltage boosting circuits can be operated in parallel when the output voltage is relatively low. When the output voltage is increased, the unit voltage boosting circuits are used to sequentially boost the voltage.

Also, the parallel connection of the unit voltage boosting circuits can be modified based on the voltage detected at the output terminal. Also, it is possible to increase the unit voltage boosting circuits one by one each time the output terminal voltage is increased by the power supply voltage Vcc. Alternatively, the unit voltage boosting circuits can be connected for (1+a round-off value of the desired voltage divided by the power supply voltage Vcc), so that the desired level of the voltage can be obtained at the output terminal OUT3-1.

Also, the connection of the unit voltage boosting circuits can favorably be determined according to the voltage between the output terminal and the power supply voltage Vcc.

Moreover, the connection of the unit voltage boosting circuits can be varied based on a resultant boosted voltage at the output terminal OUT3-1 while executing the boosting operation at minimum of current loss.

As the capacitors for carrying out the boosting operation are charged directly with the power supply voltage Vcc, the boosting operation can successfully speed up.

What is claimed is:

1. A voltage boosting circuit, comprising:
   a control unit generating transfer control signals; and
   a plurality of unit circuits provided in parallel, wherein each of said plurality of unit circuits comprises:
      a charge capacitor connected to an anode of a diode at one end and to said control unit at the other end, a cathode of said diode connected to an output terminal; and
      a charge transfer section transferring a charge from said charge capacitor to a charge capacitor of a next one of said plurality of unit circuits in response to said transfer control signals.

2. The voltage boosting circuit according to claim 1, wherein said charge capacitor in each of said unit circuits is charged from a power supply.

3. The voltage boosting circuit according to claim 2, wherein said one end of said charge capacitor is connected to said power supply via at least a rectifying element.

4. A voltage boosting circuit, comprising:
   a plurality of unit circuits provided in parallel;
   a control unit supplying a plurality of charge control signals and transfer control signals to said plurality of unit circuits; wherein each of said plurality of unit circuits further comprises:

a charging section including a charge capacitor connected to an anode of a diode at one end and to said control unit at the other end, a cathode of said diode connected to an output terminal, wherein said charging section charges said charge capacitor in response to said charge control signals; and a charge transfer section transferring a charge from said charge capacitor to a charge capacitor of a next one of said plurality of unit circuits in response to said transfer control signals.

5. The voltage boosting circuit according to claim 4, wherein said charging section comprises:

a coupling capacitor connected to said control unit at one end; and a transistor having a gate connected to the other end of said coupling capacitor, a drain connected to said power supply, and a source connected to said one end of said charge capacitor.

6. The voltage boosting circuit according to claim 5, wherein said charging section further comprises:

a holding transistor having a gate connected to said one end of said charge capacitor, a source connected to said power supply, and a drain connected to said gate of said transistor.

7. A voltage boosting circuit, comprising:

a plurality of unit circuits provided in parallel, and a control unit supplying a plurality of discharge control signals and a plurality of transfer control signals to said plurality of unit circuits, wherein each of said plurality of unit circuits comprises:

a charging section including a charge capacitor connected to an anode of a diode at one end and to said control unit at the other end, a cathode of said diode connected to an output terminal; and a charge transfer section transferring a charge from said charge capacitor to said charge capacitor of a next one of said plurality of unit circuits in response to transfer control signals;

wherein said charge transfer section comprises a coupling capacitor connected to said control unit at one end and a transistor having a gate connected to the other end of said coupling capacitor, a drain connected to said charge capacitor, and a source connected to said one end of said charge capacitor in a next one of said plurality of charge capacitors.

8. The voltage boosting circuit according to claim 7, wherein said charging section further comprises:

a holding transistor having a gate connected to said source of said transistor, a source connected to said one end of said charge capacitor, and a drain connected to said gate of said transistor.

9. The voltage boosting circuit according to claim 7, wherein said charge transfer section further comprises:

a preset transistor charging said gate of said transistor in response to a preset signal, said preset transistor having a gate connected to said preset signal, a drain connected to said power supply and a source connected to said gate of said transistor.

10. A voltage boosting method, comprising the steps of:

storing charges in charge capacitors;

sequentially transferring a charge in one of charge capacitors to a charge capacitor next to said one charge capacitor; and transferring charges in said charge capacitors to an output terminal via at least one diode.

11. The voltage boosting method according to claim 10, further comprising:

initially charging an output capacitor component with said charges stored in said charge capacitors.

12. The voltage boosting method according to claim 11, wherein said initially charging includes:

supplying a bias voltage to said charge capacitors.

13. The voltage boosting method according to claim 10, wherein said sequentially transferring includes:

intermediately charging an output capacitor component with said charge stored in each of said charge capacitors while sequentially transferring said charges to a last one of said charge capacitors.

14. The voltage boosting method according to claim 10, further including sequentially charging an output capacitor component with said charges stored in said charge capacitors.

15. The voltage boosting method according to claim 10, further including subsequently charging said output capacitor component with a charge stored in a last one of said charge capacitors, wherein said subsequently charging includes:

supplying a bias voltage to said last one of said charge capacitors.

16. The voltage boosting method according to claim 11, further comprising:

charging said output capacitor component using a power supply voltage prior to said initially charging.

17. The voltage boosting method according to claim 10, further comprising sequentially transferring a charge to a last charge capacitor of said charge capacitors to boost a voltage of said last charge capacitor.

18. The voltage boosting method according to claim 17, further comprising subsequently charging an output capacitor component with said charge stored in said last charge capacitor.

19. The voltage boosting method according to claim 18, wherein said step of subsequently charging includes:

supplying a bias voltage to said last charge capacitor.

20. A voltage boosting circuit for outputting a certain voltage from an output terminal comprising:

a control unit supplying a transfer control signal;

a diode having an anode section and a cathode section connected to said output terminal at said cathode section;

a first charge capacitor having a first one end and a first other end, and connected to said anode section of said diode at said first one end, and to said control unit at said first other end;

a first charge transfer section;

a second charge capacitor having a second one end and a second other end connected to said anode section of said diode at said second one end and to said control unit at said second other end;

a second charge transfer section;

a third charge capacitor having a third one end and a third other end, and connected to said diode at said third one end, and to said control unit at said third other end;

a third charge transfer section; and a fourth charge capacitor having a fourth one end and a fourth other end, and connected to said anode section of said diode at said fourth one end, and to said control unit at said fourth other end;

wherein said first charge transferring section is connected to said first charge capacitor and said second charge capacitor, said second charge transferring section is connected to said second charge capacitor and said third charge capacitor, and said third charge transferring section connected to said third charge capacitor and said fourth charge capacitor;

wherein said first charge transfer section transfers a charge from said first charge capacitor to said second charge capacitor in response to said transfer control signal, said second charge transfer section transfers a charge from said second charge capacitor to said third charge capacitor in response to said transfer control signal, said third charge transfer section transferring a charge from said third charge capacitor to said fourth charge capacitor in response to said transfer control signal; and wherein said control unit controls said first charge capacitor, said second charge capacitor, said third charge capacitor, said fourth charge capacitor, said first charge transfer section, said second charge transfer section, and said third charge transfer section so as to transfer only a charge in said second charge capacitor to said third charge capacitor after an output voltage at said output terminal reaches a predetermined voltage, and then transfers charges in said first charge capacitor and third charge capacitor to said second charge capacitor and said fourth charge capacitor.

21. A voltage boosting circuit, comprising:

a control unit generating transfer control signals; and a plurality of unit circuits provided in parallel, wherein each of said plurality of unit circuits comprises:
  a coupling capacitor connected to said control unit at a first end thereof;
  a first transistor connected to a second end of said coupling capacitor at a source thereof, and to said control unit at a gate thereof;
  a charge capacitor connected to said control unit at a first end thereof;
  a second transistor connected to the source of said first transistor at a gate thereof, and to a second end of said charge capacitor at a drain thereof;
  a third transistor connected to a source of said second transistor at a gate thereof, and to the second end of said charge capacitor at a source thereof, and further to the gate of said second transistor at a drain thereof;
  a first diode connected to the source of said third transistor at a cathode thereof, and to a power source at an anode thereof;
  a second diode connected to the cathode of said first diode at an anode thereof, and to an output terminal at a cathode thereof,
  wherein the source of said second transistor is connected to a source of a third transistor of a next one of said plurality of unit circuits.

22. A voltage boosting circuit, comprising:

a plurality of unit circuits provided in parallel, and a control unit supplying a plurality of discharge control signals and a plurality of transfer control signals to said plurality of unit circuits, wherein each of said plurality of unit circuits comprises:
  a charging section including a charge capacitor connected to an anode of a rectifying element at one end and to said control unit at the other end, a cathode of said rectifying element connected to an output terminal;
  a charge transfer section transferring a charge from said charge capacitor to said charge capacitor of a next one of said plurality of unit circuits in response to transfer control signals; and
  a preset transistor charging said gate of said transistor in response to a preset signal, said preset transistor having a gate connected to said preset signal, a drain connected to said power supply and a source connected to said gate of said transistor, wherein said charge transfer section comprises a coupling capacitor connected to said control unit at one end and a transistor having a gate connected to the other end of said coupling capacitor, a drain connected to said charge capacitor, and a source connected to said one end of said charge capacitor in a next one of said plurality of charge capacitors.

* * * * *